July 25, 1967 D. P. DOLBY 3,333,064

CONCAVE TAPE GUIDE WITH MEANS TO ADJUST SAME

Filed April 1, 1963 6 Sheets-Sheet 1

DALE P. DOLBY
INVENTOR

BY Robert G. Clay

ATTORNEY

DALE P. DOLBY
INVENTOR

BY Robert G. Clay
ATTORNEY

CONCAVE TAPE GUIDE WITH MEANS TO ADJUST SAME

Filed April 1, 1963 6 Sheets-Sheet 3

DALE P. DOLBY
INVENTOR

BY Robert G. Clay

ATTORNEY

July 25, 1967 D. P. DOLBY 3,333,064

CONCAVE TAPE GUIDE WITH MEANS TO ADJUST SAME

Filed April 1, 1963 6 Sheets-Sheet 4

DALE P. DOLBY
INVENTOR

BY Robert G. Clay

ATTORNEY

CONCAVE TAPE GUIDE WITH MEANS TO ADJUST SAME

Filed April 1, 1963 6 Sheets-Sheet 5

DALE P. DOLBY
INVENTOR

BY Robert G. Clay

ATTORNEY

CONCAVE TAPE GUIDE WITH MEANS TO ADJUST SAME

Filed April 1, 1963 6 Sheets-Sheet 6

DALE P. DOLBY
INVENTOR

BY Robert S. Clay

ATTORNEY

United States Patent Office 3,333,064
Patented July 25, 1967

3,333,064
CONCAVE TAPE GUIDE WITH MEANS TO ADJUST SAME

Dale P. Dolby, East Palo Alto, Calif., assignor to Ampex Corporation, Redwood City, Calif., a corporation of California Filed Apr. 1, 1963, Ser. No. 269,689
15 Claims. (Cl. 179—100.2)

This invention relates to positioning mechanisms for the female guides of rotary head magnetic tape recording and reproducing machines, and particularly to such mechansims adapted to control the pressure of engagement of the heads and tape.

In rotary head magnetic tape machines such as are used in television and broad band recording, the tape is usually drawn longitudinally parallel to the axis of a rotating head drum, on which are mounted a number of heads that sweep the tape transversely. A so-called female guide is used to cup and hold the tape in the required arc to fit against the head drum. Sufficient pressure is usually employed to cause the heads to dig into the tape, distorting and stretching the tape around the head. This stretching action causes an actual physical increase of the wavelength of the signal recorded on the tape (e.g. during reproduction), and a consequent decrease in the frequency of the signal as it is reproduced. The degree of this change is a function of the position of the female guide radially with respect to the head drum.

This phenomenon is important in two respects. First, it requires that precisely the same head-to-tape pressure be provided for both recording and playback of a tape, especially when the tape is played back on a different machine than was used for recording. Second, if the tape has been stretched or shrunk subsequent to recording, as by atmospheric or other conditions, it is necessary to make some corrective adjustment of the head-to-tape pressure during playback, even when the tape is played back on the same machine it was recorded on.

One of the adjustments that often becomes necessary is that of increasing the head-to-tape pressure at one edge of the tape while decreasing such pressure at the other edge of the tape, in order to eliminate certain distortions in a television picture that has been recorded on the tape. However with prior art mechanisms, it has been impossible to make such changes without concurrently changing the pressure at the centerline of the tape, i.e. at the central axial plane of the female guide. Thus a different distortion is introduced, which is corrected only at the expense of redistorting the picture in the first mode mentioned above. By repeated correction and recorrection in this manner, a satisfactory picture eventually may be obtained, but the process is difficult and time consuming.

Accordingly, it is an object of the present invention to provide a positioning mechanism for controlling the head-to-tape pressure of a magnetic tape and rotary head, with the pressure at the edges of the tape being controllable substantially independently of the pressure at the centerline of the tape.

It is a further object of the invention to provide a positioning mechanism as above described and composed of parts that are more simply and economically manufactured and assembled, and are easier and more accurate to operate, and longer lasting in wear and service.

A positioning mechanism in accordance with the invention includes a female guide mounted on a swinging arm, the pivot for which is substantially a universal joint. The guide end of the arm is slidably mounted on two bearing elements, providing with the pivot a three-point suspension for the arm. The arm may be swung toward and away from the rotating head drum, sliding on the bearing elements in a plane parallel to the central axial plane of the female guide, so as to adjust the head-to-tape pressure at the centerline of the tape. The guide end of the arm may also be moved toward and away from the two bearing elements so as to inversely adjust the head-to-tape pressures at the edges of the tape. Each of these adjustments can be made substantially independently of the other.

A better understanding of the invention may be had by reference to the following description, taken in conjunction with the accompanying drawings, in which.

Figure 1:
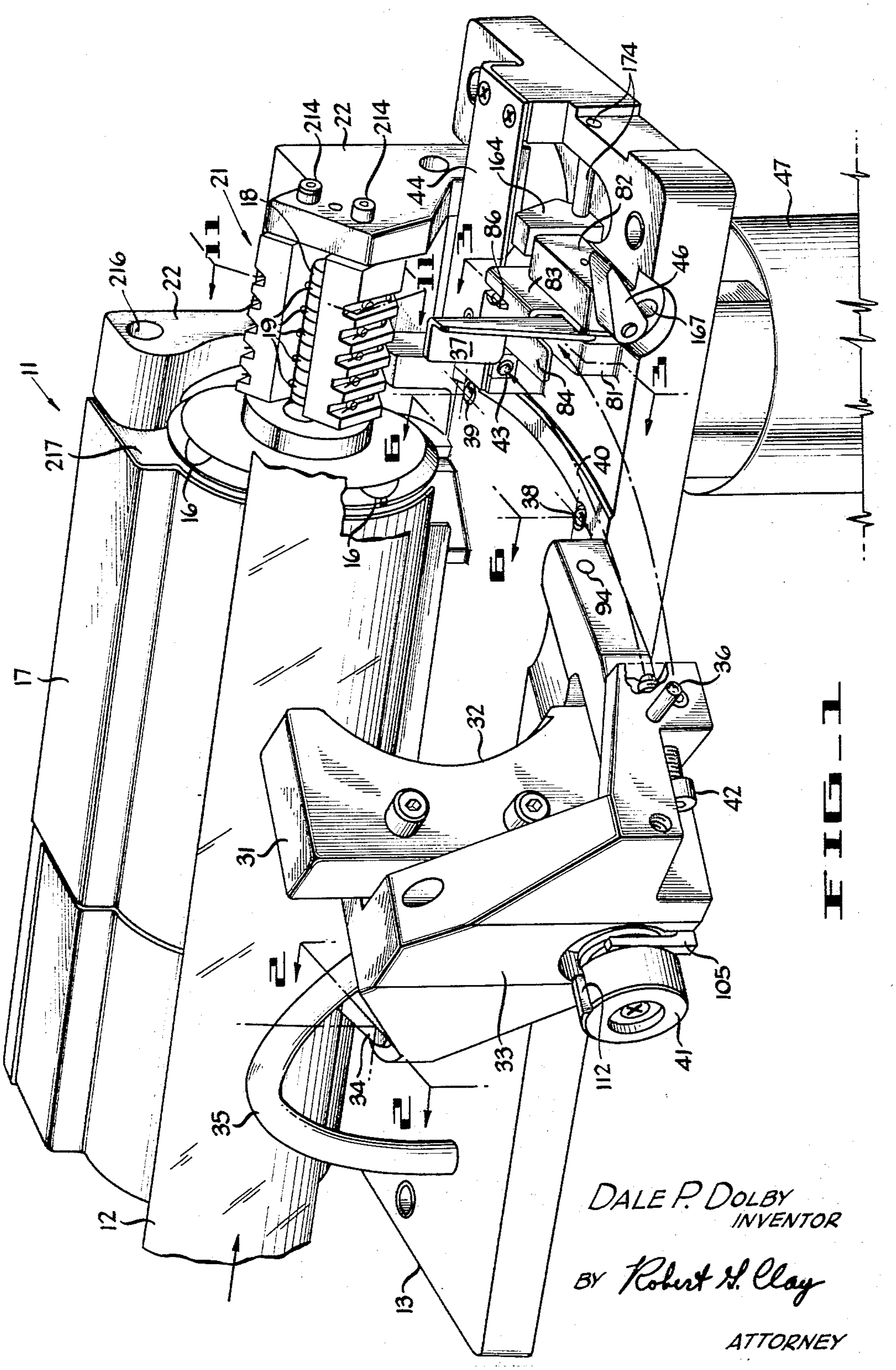
FIGURE 1 is a perspective view of a rotating head mechanism including the positioning mechanism of the invention.

Referring now to the drawing and particularly to FIGURE 1 thereof there is shown a rotating head apparatus 11 for a magnetic tape 12, the apparatus including a base plate 13, and a rotating head drum 14 mounted axially parallel to the base plate 13. Four magnetic transducing heads 16 are mounted and equally spaced on the periphery of the drum 14. The head drum 14 is mounted on the shaft of a motor (not shown) which is contained within a housing 17 along with other portions of the apparatus not here shown, the motor being mounted solidly on an extension of the base plate 13. An extension 18 of the motor and head drum shaft is used for mounting a number of commutating segments 19 for transmission of electric signals to and from heads 16. A commutating brush mounting block 21 is also mounted on an extension 22 of the base plate 13.

The above described elements are commonly found in one form or another on nearly every rotating head mechanism, as is also a female guide 31 mounted for opening as shown in the figure for facilitating threading and unthreading of the tape 12, and for closing to hold the tape against the rotating head drum 14. In the illustrated example, guide 31 has an arc shaped face 32, and is mounted on a swinging arm 33, so that the face 32 can be swung toward and away from the head drum. It is noted that the angle of opening for the arm 33 and guide 31 is exaggerated in FIGURE 1 for the purpose of illustration, and that it is not ordinarily necessary to open the arm, even for threading, to this degree.

Various important features of the apparatus are shown separately and in detail in FIGURES 2–11, but are best illustrated in their general relation to one another in FIGURE 1. Briefly, and referring principally to FIGURE 1, these features include the outer portions of a pivot pin assembly including a retaining spring 34; an air suction line 35 for the female guide; a latching mechanism including a latch pin 36 and a latching lever 37 for latching and holding the arm 33 and female guide 31 while at the same time urging the guide toward the head drum 14; a pair of ball guide bearing elements 38 and 39 and a raised track 40 for the arm 33 and for cooperating with a vertical adjusting mechanism, including a manually operable knob 41 for adjusting the vertical position of the female guide 31. Also shown is an adjustable bearing bolt 42, having a tungsten carbide tip, and cooperating bearing ball 43, which extends from a mechanism that is concealed in the figure beneath a cover plate 44, for delicately adjusting the horizontal position of the female guide 31 with respect to the head drum 14. This latter mechanism is movable between various operating mode positions by means of a manually operable lever 46. Also shown is a solenoid 47 for a purpose later to be described.

Figure 2:
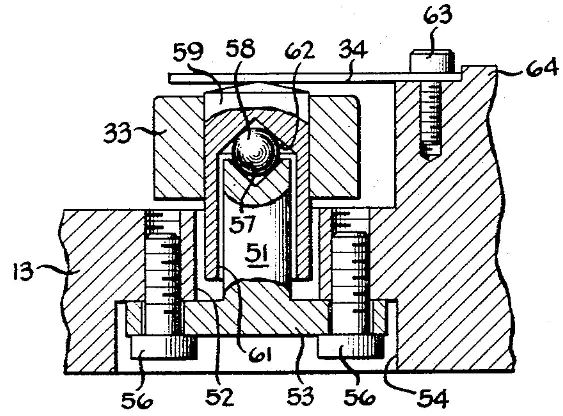
FIGURE 2 is an elevation section taken substantially along the plane of lines 2—2 of FIGURE 1.

Referring now to FIGURE 2, the pivot mechanism for the arm 33 is shown. In order to make it possible to delicately adjust the female guide in all directions, it is advantageous to have a pivot mechanism that is substantially a universal joint at least within a limited range of movement suitable for accomodating the desired adjustments. Accordingly a pivot pin 51 is mounted to extend upwardly from the base plate 13 as by means of a bore 52 extending through the base plate and centrally mounting the pin 51, the pin having a flange 53 secured to the base plate within an accommodating recess 54 as by means of fasteners 56. The pin 51 is adjustable in elevation as by means well known in the art. The upwardly projecting end of the pin 51 has a conical recess 57 formed therein and mounting a bearing ball 58, forming the actual bearing element between the base plate and the arm 33. To mount the arm thereon, insert 59 is mounted in a corresponding bore in the arm and projecting downwardly therefrom. The lower end of the insert has a recess 61 fitting loosely over the pin 51 and terminating in a conical recess 62 engaging the ball 58 and centralizing the insert 59 with respect to the pin 51. To secure the insert 59 axially on the pin, the retaining springleaf 34 previously mentioned is mounted as by a fastener 63 on an extension 64 of the base plate 13, and bearing downwardly upon the upper conical end of the insert 59. It is thus seen that the arm 33 has a limited degree of tilting motion with respect to the pin 51 in all directions, as well as freely pivoting motion about the pin, but is yet retained securely mounted thereon.

Figure 3:
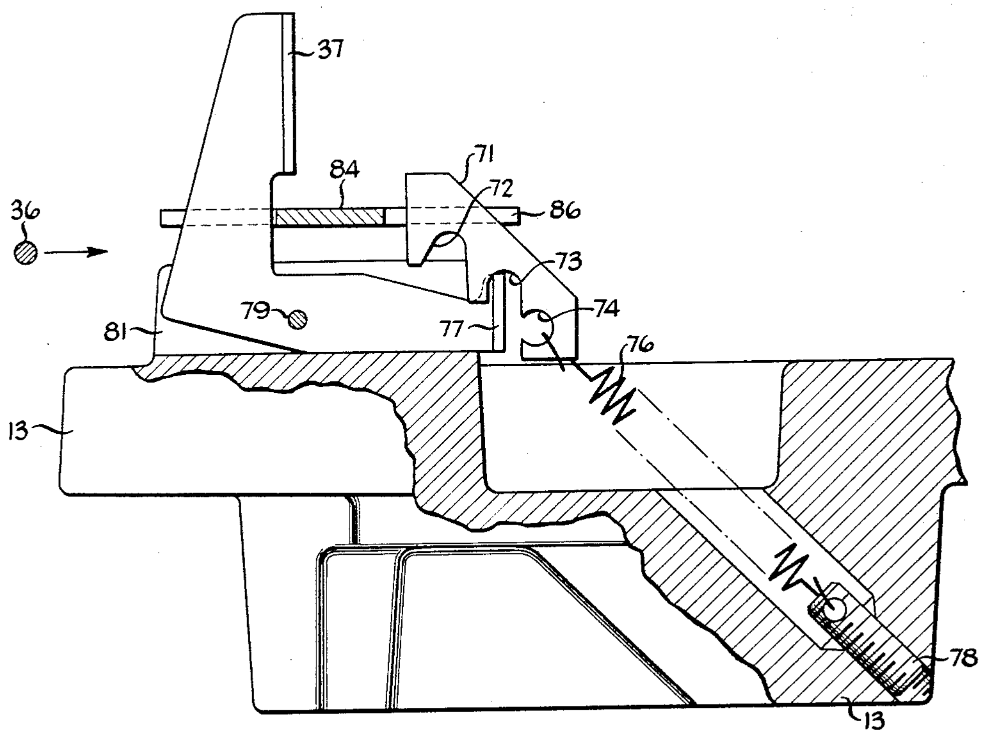
FIGURE 3 is an elevation section taken substantially on the plane of lines 3—3 of FIGURE 1.

Referring now to FIGURE 3 the latching mechanism including the lever 37 is shown in greater detail. It will be understood that the latching pin 36 extending from the arm 33 previously described, moves toward the latching mechanism as the arm pivots toward the magnetic head drum, the pin 36 eventually coming to a position where it may be engaged by a latching hook 71. The hook 71 is a small plate-like element having a hook-shaped recess 72 formed therein for engaging the pin 36, and second and third recesses 73 and 74 formed therein for engaging respectively an extended end of the lever 37 and an end of a tension spring 76. The recess 73 is actually engaged by a flange 77 on the lever 37 in such a way that the hook 71 is supported vertically against the pull of gravity and both vertically and horizontally against the pull of the spring 76, which is extended downwardly and toward the rotating head drum at approximately a 45-degree angle. The other end of the spring is secured to a bolt 78 threaded into the base plate 13. The lever 37, which is generally L-shaped, is mounted as by a pivot pin 79 between a pair of extensions 81 and 82 (the latter shown in FIGURE 1) of the base plate 13. Also mounted beside the lever 37 and between the extensions 81, 82 by means of the pin 79 is a plate 83 (FIGURE 1) having a generally horizontal flange 84 extending therefrom to define a lateral guide for the pivoting movement of the pin 36 toward and away from the hook 71. The flange 84 has a slot 86 formed therein to define a lateral guide for the positioning and movement of the plate-like hook element 71.

Figure 4:
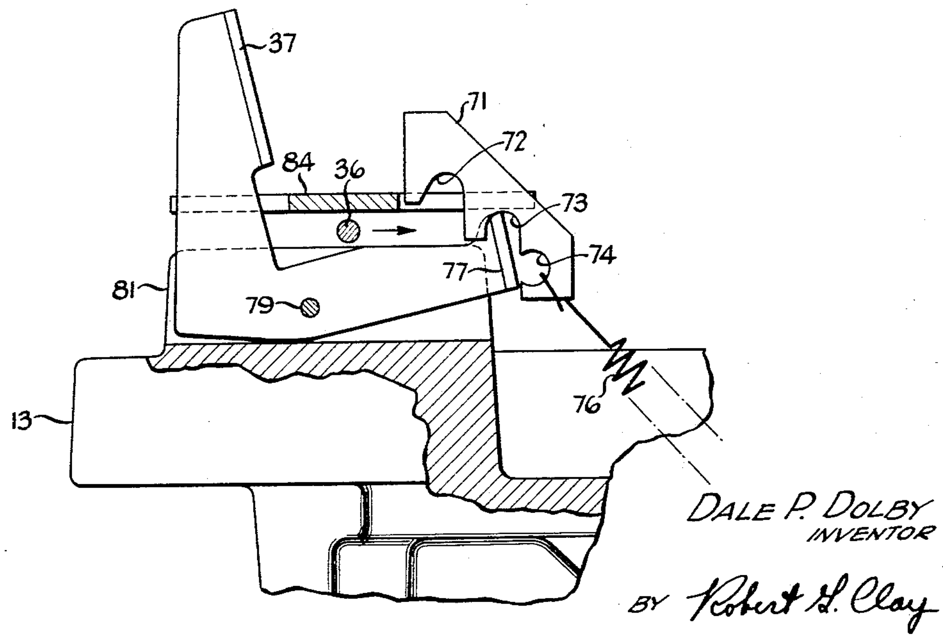
FIGURE 4 is an elevation section substantially the same as that of FIGURE 3, with the apparatus in a different position.
Figure 7:
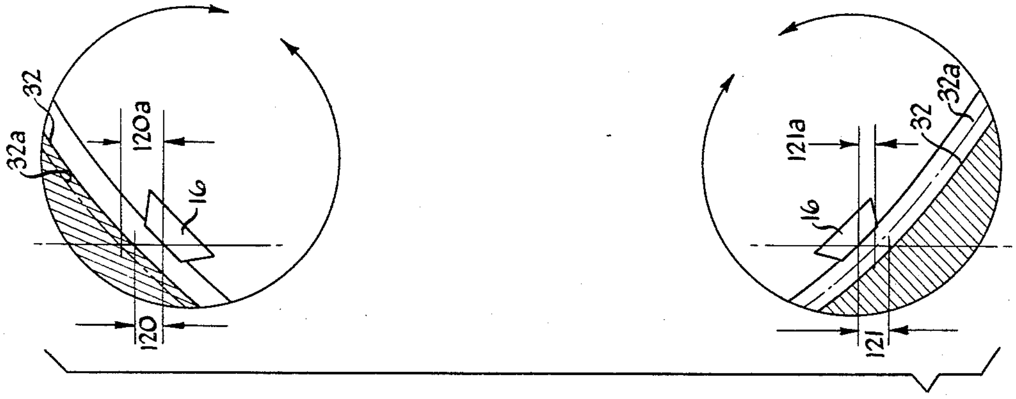
FIGURE 7 is an enlarged view of the portions of the apparatus enclosed within the lines 7—7 of FIGURE 6.

It will be noted that the latching hook 71 is not automatically operable upon engagement with the pin 36 but must be manually operated as by movement of the lever 37 as shown in FIGURE 4 in order to admit the pin 36 into latching relationship therewith. Thus, the arm 33 and female guide cannot be accidentally slammed shut into fully latched contiguity with the head drum 14, and possible damage to the delicate apparatus is prevented.

Figure 5:
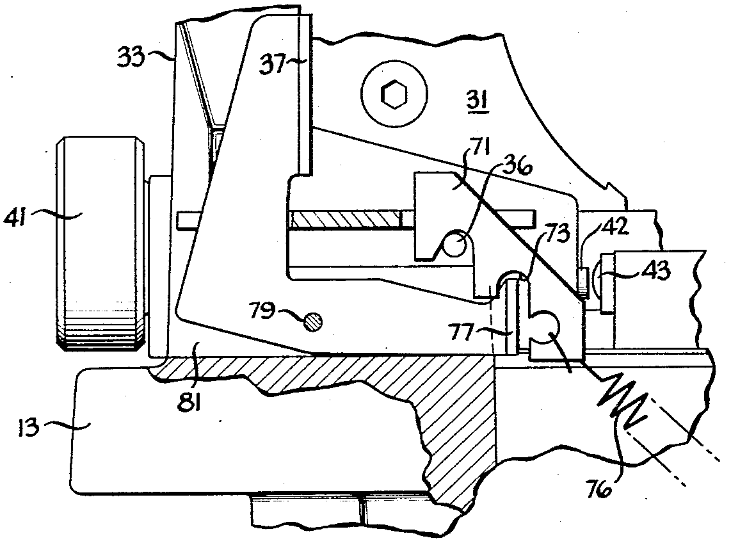
FIGURE 5 is an elevation section substantially the same as FIGURES 3 and 4 with the apparatus in a still different position.
Figure 6:
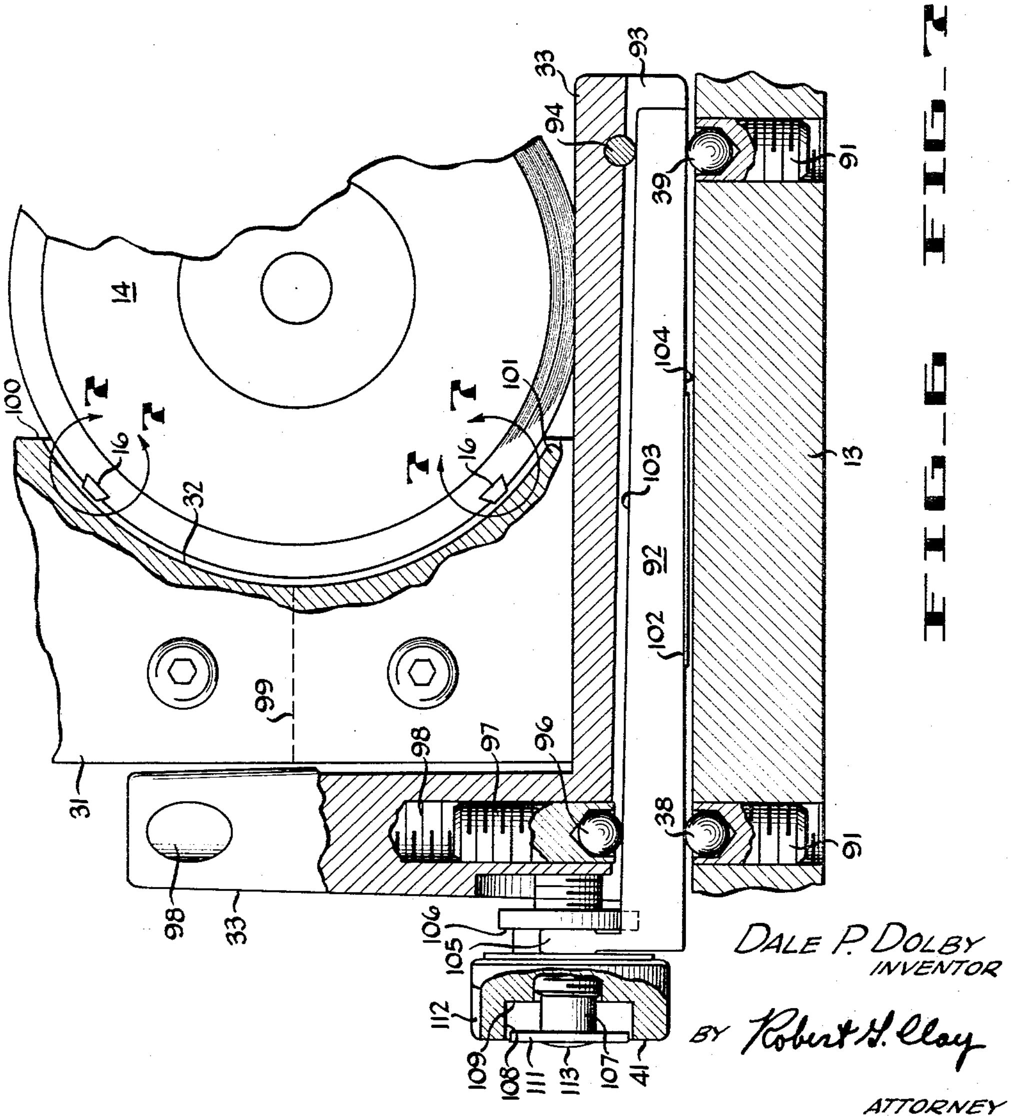
FIGURE 6 is an elevation section taken substantially on the plane of line 6—6 of FIGURE 1, with the apparatus in a closed position.

In order to utilize the spring 76, in the latched position of the arm, to provide a proper urging of the female guide 31 and arm 33 toward the head drum 14, and also toward the base plate 13, and snugly against the bearing balls 38, 39 previously described, it is necessary that the flange 77 of the lever 37 be relieved of engagement with the recess 73 of hook 71 as shown in FIGURE 5. In this figure it will be seen that the spring 76 urges the hook 71 and pin 36 to the right in such a way that the bearing bolt 42 of the arm firmly engages the bearing ball 43 of the base plate previously described, and the arm 33 is thus stopped against further movement to the right under the influence of the spring 76. The adjustment of the bearing elements 42, 43 and 38, 39 is such that the recess 73 of hook 71 fits loosely around the flange 77 of lever 37, and the lever can thus in the latching position of the elements play no part in influencing the adjustment of the female guide 31. The actual horizontal positioning of the arm and female guide is controlled by the position of the bearing ball 43, which is in turn positioned by a mechanism later to be described; and the vertical position of the female guide is controlled also against the tension of the downwardly angled spring 76 as by means of the apparatus described in detail as follows:

Referring now to FIGURE 6, the base plate 13 is shown mounting the bearing ball guides 38 and 39, each of the balls being press-fitted into a recess in the end of a set screw 91, and each of the set screws being threaded through an appropriate bore in the base plate for vertical adjustment to a plane parallel to the top surface of the base plate. The balls 38, 39 project substantially above the level of the track 40. The portion of the arm 33 that actually engages the bearing balls 38, 39, in the closed position of the arm, is a wedge element 92, which is made of tungsten carbide and is mounted on the arm and for adjustable sliding motion relative to the arm in the pivoting direction of the arm. The wedge element 92 is substantially rectangular in cross section and fits within a lower recess 93 in the arm and bearing against a bearing pin guide 94 and bearing ball guide 96 extending from the arm. The bearing ball 96 is press-fitted in a recess in the end of a set screw 97 threaded vertically into a bore 98 in the arm 33. The pin 94 is permanently mounted horizontal and transverse to the length of the slot 93 in the arm, and engages the upper surface of the wedge element 92 along a generatrix of the pin, so as to provide with the ball 96 the equivalent of a three-point suspension of the arm upon the wedge. The position of the ball 96 is adjustable as by the means of the screw 97 to set the central axial plane 99 of the female guide 31 strictly parallel to the plane of the base plate 13. The central axial plane 99 of the guide 31 is defined as a plane passing through the axis of curvature of the arc-shaped cylindrical face 32 of the guide and midway between the upper and lower edges 100 and 101 of the face 32. It is also noted that the wedge element 92 is retained on the arm 33 as by means of a spring leaf 102 extending from the arm and bearing upwardly against the lower face of the wedge element 92.

It will be seen that the wedge element 92 has a pair of inclined upper and lower surfaces 103 and 104 tapering convergingly toward the right in FIGURE 6, and that consequently when the wedge element 92 is moved to the right or to the left, it causes a corresponding elevation or depression of the arm 33 and guide 31. The very important result of such an adjustment is described in detail hereinafter, but the means by which the adjustment is carried out is now described as follows. The outwardly extending end of the element 92 has a fork 105 formed thereon and extending upwardly to engage a peripheral groove 106 that is formed in a portion of the knob 41 previously described. The knob 41 is threaded upon a threaded shaft 107 extending from the arm 33 so that upon turning movement of the knob 41, the knob moves inward or outward upon the threaded shaft 107 carrying with it the fork 105 and element 92. In FIGURE 6, the knob 41 is shown at the midpoint of its range of movement, and it will be noted that a central recess 108 in the knob has an inner face 109 that engages a collar 111 extending from the shaft 107 at the most outward limit of the range of motion of the knob 41. The position of the knob at the midpoint of the range as shown in FIGURE 6 can be quickly verified by the fingers of the operator because at this point the outer surface of the collar 111 is on the same plane as the outer surface of the knob 41. Also a groove 112 is formed on the knob so as to be located at the most upward portion thereof at the precise mid-range of motion of the knob. The collar 111 is retained on the end of the shaft 107 as by means of a screw 113.

As a very important feature of the invention it will be noted that vertical adjustment of the female guide 31 results in substantially no alteration of the horizontal spacing between the guide and head drum at the central axial plane 99 thereof, because the tangential planes of the two surfaces are vertical at this point and relative vertical movement of the two planes has no effect upon their horizontal spacing. The vertical adjustment of the guide however has a most important effect on the spacing between the guide and drum 14 near the extremities 100 and 101 of the guide surface 32, as particularly shown in FIGURE 7. In this figure the normal equal spacing between the illustrated upper and lower heads 16 and the guide surface 32 is indicated by the arrows 120 and 121, it being understood that although for simplicity the spacings shown are vertical, the actual radial spacings are substantially in the ratio of $1/\sqrt{2}$ to the vertical spacings. When however the female guide is raised a certain distance, the upper vertical spacing is increased as illustrated by the dashed new position **32*a* for the guide surface and the arrows 120*a* for the vertical spacing; and at the same time the vertical spacing between the lower head 16 and the guide face 32*a* is decreased as illustrated by the arrows 121*a*. Also here it will be understood that the actual radial spacings stand in the ratio of $1/\sqrt{2}$ to the vertical spacing shown. In other words, the very important adjustment that is so often needed, of increasing the head-to-tape pressure at one edge (here a lower edge) of the tape while at the same time decreasing the head-to-tape pressure at the other edge (here the upper edge) of the tape is easily effected without alteration of the head-to-tape pressure at the centerline of the tape (i.e., near the centeral radial plane 99** of the guide).

Figures 8, 9, 10:
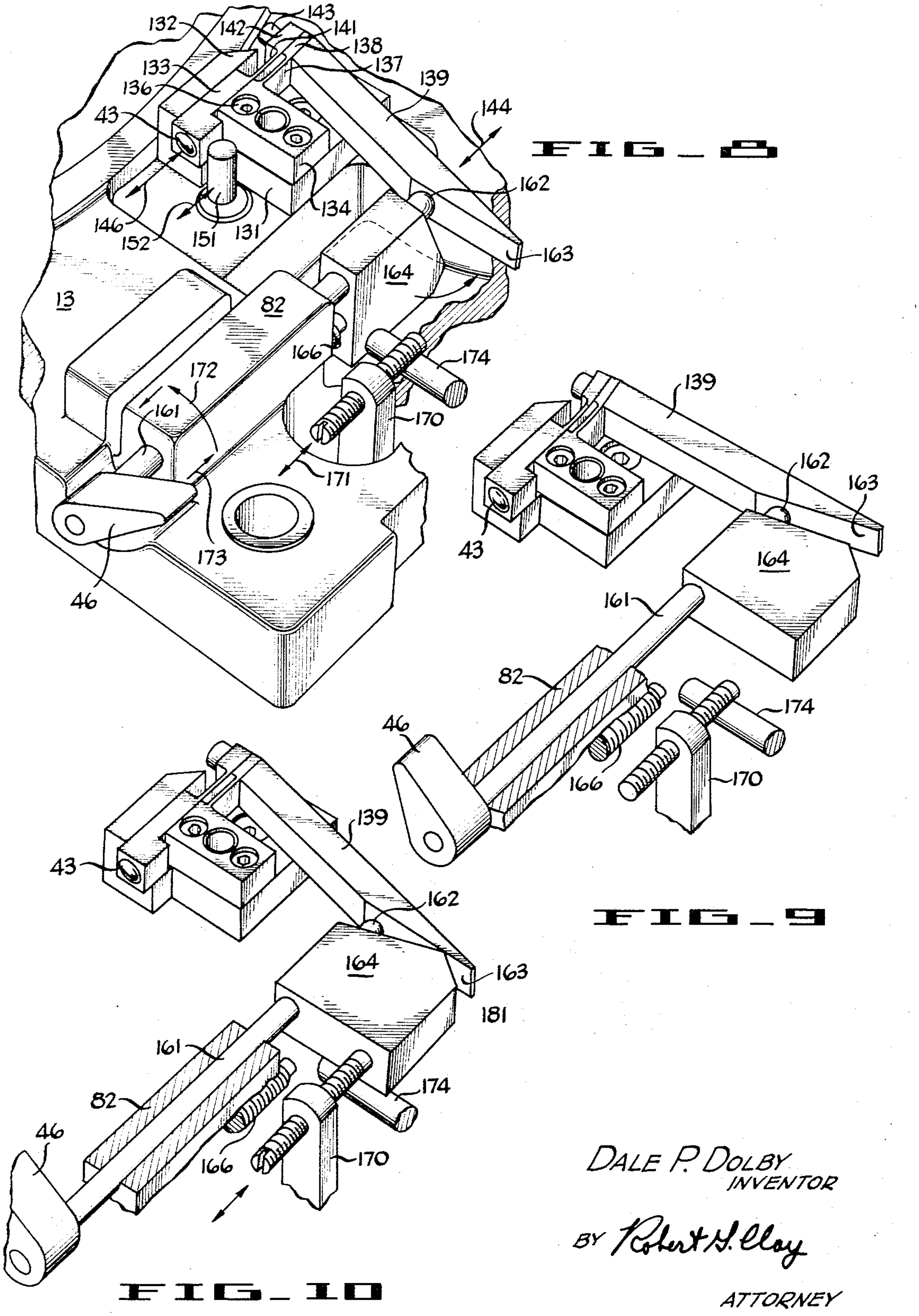
FIGURE 8 is an enlarged perspective view of a portion of the apparatus shown in FIGURE 1.
FIGURE 9 is a perspective view of a portion of the apparatus shown in FIGURE 8 in different position.
FIGURE 10 is a perspective view of the apparatus shown in FIGURE 9 in a still different position.

Referring now to FIGURE 8, the mechanism for adjusting the horizontal position of the arm and female guide as by means of moving the bearing ball 43 against the end of screw 42 is illustrated. On the base plate 13 is solidly mounted a block 131 having an upstanding flange 132 defining a guideway for a sliding bearing element 133, in the end of which is cemented the bearing ball 43. Another and opposite guideway for the bearing element 133 is defined by a block 134 mounted on the block 131 as by means of screws 136. In order to provide a substantially frictionless and wearless mechanism for moving the bearing element 133 in its longitudinal sliding motion, the block 134 has a spring leaf extension 137 terminating in a spacing block 138 and defining a flexible fulcrum for a lever arm 139. The bearing element 133 also has a spring leaf extension 141 terminating in a block 142. A bolt 143 is threaded through the block 142 and the block 138 and into the end of the lever arm 139 so as to secure the three elements tightly together. It is clear that when the other end of the lever arm 139 is moved as indicated by the double headed arrow 144, then the bearing element and ball 43 are moved reciprocally and oppositely in the directions represented by the double headed arrow 146. The mechanical advantage of the lever arm 139 is such that a comparatively large movement at the end of the lever arm results in an extremely small and precise movement of the bearing ball 43. Also, the two spring leaves 137 and 141 provide an operational loading for the lever arm 139, urging the lever arm (e.g., as in FIGURE 8) in a clockwise direction.

Before describing the actuation of the lever arm 139, it is appropriate here to interrupt for a description of quite a different feature that is illustrated best in FIGURE 8: namely a means, operated by the solenoid 47 previously described (FIGURE 1), for preventing engagement of the bearing bolt 42 of the arm and bearing ball 43, under certain circumstances, as a safety measure. This means includes an eccentric cam pin 151, which is coupled to the solenoid 47 for rotation between two positions. In the first position the side of the pin that is closest to the arm 33 adjacent the bearing bolt 42 is moved substantially toward the arm, as indicated by the left most head of double headed arrow 152, and engages and holds the arm in such a position that the tip of the bearing bolt 42 does not engage the bearing ball 43. This position is assumed by the solenoid and the pin 151 when the solenoid is de-energized; and the solenoid is connected in the circuits of the recording machine in such a way that the solenoid is de-energized only when the power to the machine is shut off or the machine is otherwise inoperative. When the machine operates, the solenoid 47 is energized, rotating the pin 151 to a releasing position in which the side of the pin closest to the arm 33 adjacent the bolt 42 is moved in the opposite direction as shown by the right hand head of the arrow 152, to permit the bolt 42 to freely engage the bearing ball 43 and to have a substantial range of movement in both directions of the arrow 146 without interference from the pin 151. Thus the pin 151 operates as a safety feature in that upon failure of the power to the apparatus while it is in the operating mode, the female guide 31 is immediately withdrawn from pressurized engagement with the tape and head drum 14, and damage to the tape is avoided. Likewise, the solenoid 47 may be connected in such a way that a time delay ensues after the machine is set in operation, before the guide 31 can be brought into pressurizing engagement with the tape and head drum, thus ensuring that the tape is not engaged with the head until the head drum has attained its full operating velocity.

The actuation of the lever 139 is accomplished in either of two different ways, the selection of the desired way being accomplished by means of a manually operable control device including the lever 46 previously described (FIGURE 1). The first way or mode of operation to be considered is operation in a "standard" position, in which the lever arm 139 does not move at all, but holds the bearing ball 43 and arm and female guide 31 in a precisely fixed and predetermined position with respect to the head drum 14. This position is desirable when for example a tape is to be recorded on the recording machine and played back immediately on the machine, it being clear that no adjustment of the spacing would be needed, and that any effort expended should be directed toward ensuring that precisely the same spacing be provided for each such operation after recording. This arrangement of the apparatus is obtained as follows, referring to FIGURE 8. The manually operable lever 46 is attached to a shaft 161, which is journaled, for endwise translation and rotation, in the extension 82 of the base plate 13; and the shaft 161 terminates in a rounded end 162 bearing against a flat portion 163 of the free end of the lever arm 139. A bearing arm 164 is affixed to the shaft 161 and extends radially downwardly therefrom, and is engaged by the end of a set screw 166, so as to be stopped against movement away from the lever arm 139. The position of the set screw 166 may be adjusted as by access through a bore 167 (FIGURE 1), but ordinarily the position of this screw is not meant to be changed except at the factory, and the machine in standard position is operated always with the screw in the same position, holding the bearing arm 164 in the same position, and also the end 162 of shaft 161, the lever arm 139, and the female guide 31, all in a fixed standard position. It is understood that the spring leaves 137 and 141 are stressed in this position so as to urge the arm 139 to hold the shaft 161 and bearing arm 164 against the end of the set screw 166.

In practice it has been found that the establishment of the standard position as above described is so accurate and precise, that so long as the same initial spacings are provided between the guides 31 and head drums 14 in two or more different machines, then a tape that has been recorded on one of the machines in the standard position can be played back on any of the other machines in the standard position without need for adjustment. If there is however any difference between the spacings as established in the standard position of one machine from the standard position of another machine, or if the tape has changed dimensions as is not unusual, an adjustment can be performed automatically and without need for disturbing the setting of the machine in its standard position, as by manually changing the control apparatus to the arrangement in which the lever arm 139 is operated in a range of positions, as follows.

A pivoting arm 170 is provided, which represents the operative end of an apparatus, of a type well known in the art, for sensing and correcting frequency errors in the magnetic tape. For example, in a typical such apparatus, not here illustrated, a circuit receives the signal from each head 16 as it traverses the tape, comparing the actual frequency of the television signal equalizing pulses, as played back from the tape, with a desired standard frequency. If the actual frequency is too great, the circuit operates a servo motor to move the pivoting arm 170 away from the lever arm 163 as shown by arrow 171 with the object of increasing the head-to-tape pressure and thus stretching the tape at the head to increase the wave length of the recorded signal and decrease the frequency of the signal from the head. If the signal from the head is of too small a frequency, the pivoting arm 170 is moved toward the lever arm 139. In order to couple the lever arm 139 to this arm 170, it is necessary to rotate the shaft 161 in a counterclockwise direction as illustrated by the arrow 172 of FIGURE 8. However, as an interlock or safety feature, structure is provided to make such a rotation of the shaft impossible except following a translation as in the direction of arrow 173; this rotation is prevented in fact by means of a pin 174 solidly mounted on and extending from the base plate 13 (see FIGURE 1), and terminating just short of the downwardly extending bearing arm 164 in the standard position of the arm as shown in FIGURE 8. The position of the pin 174 however is also such that when the shaft 161 is pushed in the direction and approximately for the distance illustrated by arrow 173, the bearing arm 164 clears the pin 174 and may be rotated to the position shown in FIGURE 9. It is noted that in this position the end 162 of the shaft 161 alone engages the flat portion 163 of the lever arm 139; and also that in this position the bearing ball 43 is pushed to its extreme limit of motion in the direction corresponding to that for moving the female guide 31 away from the head drum 14, so that damage to the tape is avoided during the process of altering the mode of operation of the machine.

The position of the bearing arm 164 shown in FIGURE 9 is merely an intermediate position, and as soon as it has been attained, the shaft 161 and bearing arm 164 are permitted to slide longitudinally in a direction away from the lever arm 139, and to the position illustrated in FIGURE 10. In this position, the bearing arm 164 directly engages the arm 170 and the flat portion 163 of the lever arm 139 is engaged only by a ridged portion 181 of the bearing arm 164, the end 162 of the shaft 161 being out of engagement with the lever arm 139 in this position. Thus movement of the arm 170 in response to frequency error corrections causes direct translation of the bearing arm 164 and pivoting of the lever arm 139. The object attained by having the lever arm 139 engaged by the ridged portion 181 of the bearing arm 164 is that translation is imparted by the arm 170 in a direct line through ridged portion 181 to the lever arm 139, thus making the response of the apparatus more accurate and sensitive.

In the position of the apparatus shown in FIGURE 10, it will be noted that the pin 174 still operates as an interlocking mechanism, in that it lies directly beneath the bearing arm 164 and prevents its clockwise rotation back to the position illustrated in FIGURE 8; and to re-attain the latter position, it is necessary to manually translate the shaft 161 to the limiting position illustrated in FIGURE 9 and then rotate the shaft in a clockwise direction, also as shown in FIGURE 9. It is also noted that in the position shown in FIGURE 10, the bearing arm 164 is not engaged or stopped by the set screw 166, which is needed only to establish the standard position above described for the apparatus.

In both the standard and range mode of operation of the female guide in the horizontal direction described above, it should be understood that the vertical position of the guide is manually controlled as by rotation of the knob 41. Under ordinary circumstances, the knob 41 would be set in its natural position at the mid-point of its range of movement, so that the central axial plane 99 of the female guide 31 (FIGURE 6) coincides with or contains the axis of the rotating head drum 14; and so that the spacings and head-to-tape pressures at the edges of the tape are equal, as illustrated by the arrows 120 and 121 of FIGURE 7. However it is also noted that these spacings and pressures at the edges of the tape can be manually adjusted as by rotation of the knob 41 even while the machine is in a standard position of horizontal adjustment, and even when the machine is operating through a range of horizontal positions as illustrated by the arrangement of FIGURE 10.

Figure 11:
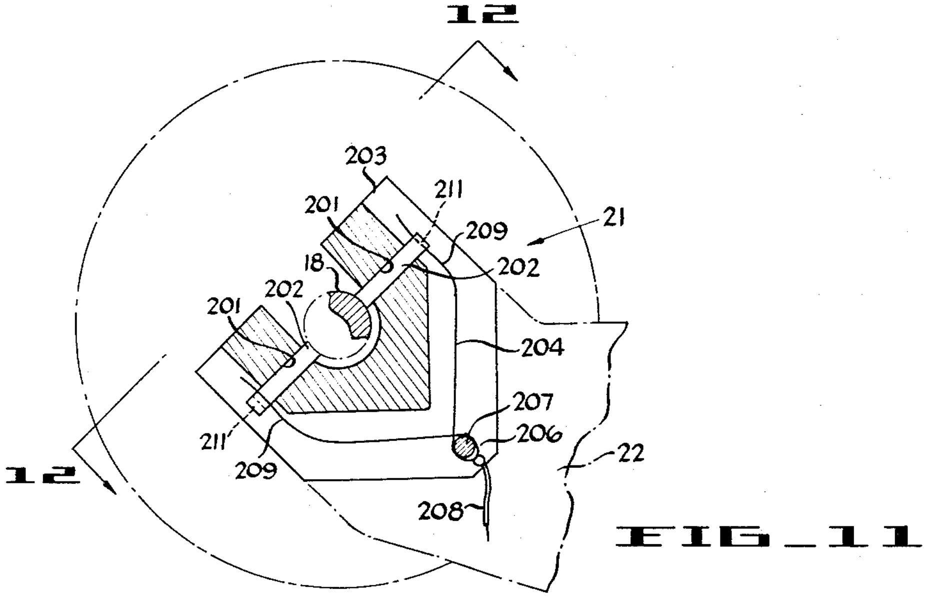
FIGURE 11 is an enlarged close sectional view taken substantially along the plane of lines 11—11 of FIGURE 1.
Figure 12:
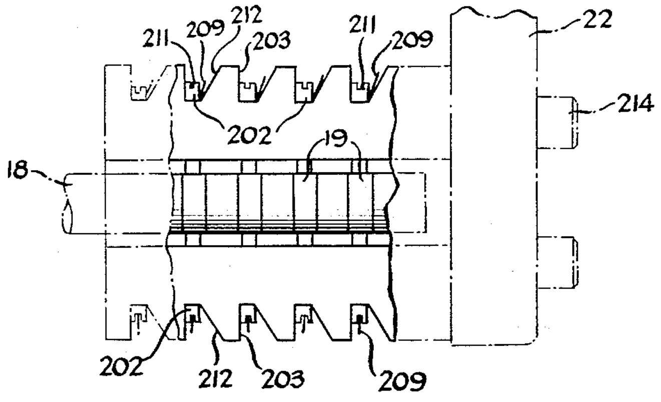
FIGURE 12 is a fragmentary view taken substantially along the plane of lines 12—12 of FIGURE 11.

A further feature of importance is represented by the commutating brushing mounting block 21 mentioned in the description of FIGURE 1 and also illustrated in FIGURES 11 and 12. As shown in FIGURE 11, the block has a generally U-shaped cross section and contains a number of bores 201 and mounting brushes 202. Each of the bores 201 terminates on the outer surface of the block in a corresponding groove 203 in which is mounted a substantially U-shaped spring clip 204 that functions as an electrical lead from each pair of oppositely mounted brushes 202. Each clip 204 has a loop portion 206 through which is inserted a pin 207 made of insulating material, such as plastic, for retaining the clip in position; and a single electrical lead 208 is soldered to each loop portion 206. Each clip 204 has a pair of end leg portions 209 fitting, in the assembled position, in a corresponding groove 211 formed in the end of the corresponding brush 202. Thus the spring clip urges the brush inwardly and into bearing engagement with the corresponding commutating segment 19 of shaft 18, and serves as well as an electrically conducting lead from the brush. It will be noted however that during the assembling and disassembling process for the machine, the block 21 and its arrangements above described also have a convenient function. It is ordinarily difficult to make such assembly or disassembly without dropping out a number of the tiny brushes 202. For this purpose then an intermediate stage of the assembly or disassembly is one in which the leg 209 of the clip 204 is not engaging the groove 211 in the brush, but is merely frictionally engaged with the side of the brush as illustrated for the lower most legs 209 in FIGURE 11, and the upper most legs 209 in FIGURE 12. As shown in FIGURE 12, the grooves 203 each have a sloped side 212 constituting a cam surface that tends to wedge the leg 209 against the brush 202 when the clip 204 is in position, it being understood that the spring load of the clip 204 naturally tends to urge each of the legs 209 inwardly and toward one another. During the assembly process, the brushes may be thus assembled, and when everything is mounted in its correct relationship with the shaft 18, then each of the legs 209 may be lifted as with a pair of tweezers and fitted into the corresponding groove 211 of its brush. During the dissassembly process, a similar step can be taken in which each of the legs 209 is picked out of the groove 211.

As shown in FIGURE 1, the block 21 with its brushes is secured to extension 22 as by means of fasteners 214; and can be easily removed as a unit, either by unfastening the fasteners 214, or by removing the entire extension 22, which is retained as by means of fasteners 216 to an extension 217 of the base plate 13.

In operation, the following adjustments are intended to be made principally at the factory and not in the field except under special circumstances; (1) adjustment of set screws 91 and 97 (FIGURE 6) to establish the lower inclined surface 104 of the wedge 92, and the central axial plane 99 of the female guide, parallel to the plane of the base plate 13; (2) adjustment of the bearing bolt 42 (FIGURE 1) and/or set screw 166 (FIGURE 8) to establish the precise horizontal spacing between the female guide 31 and head drum 14 in the "standard" mode of operation of the machine. On the other hand, operational adjustments are intended to be made as follows. First the tape is threaded as by being placed in the position illustrated in FIGURE 1, and the arm 33 with female guide 31 is closed and latched as by manually pushing the lever 37 to the left as shown in FIGURE 4 to clear the hook 71 for entry of the latch pin 36 of the arm, and releasing the lever 37 when the arm is fully closed to provide a latched condition as shown in FIGURE 5, in which the spring 76 urges the arm and its bearing bolt 42 into engagement with the bearing ball 43. This of course is the position permitted only when the machine is switched into an operative mode and the solenoid 47 (FIGURE 1) is energized to rotate the eccentric pin 151 (FIGURE 8) to a position not engaging the arm 33. With the manually operable lever 36 in the position illustrated in FIGURES 1 and 8, the female guide is automatically positioned in the "standard" operating position, precisely spaced for a predetermined distance away from the head drum 14. The position is precisely maintained by the stopping set screw 156 engaging the bearing arm 164 and holding the end 162 of shaft 161 against movement of the lever arm 139 induced by spring leaves 137 and 141 and the latch spring 76 previously described. To arrange the apparatus for automatic adjustment through a range of spacings, the lever 46 is pushed to cause the bearing arm 164 to clear the pin 174, and the lever 46 is then turned in a counterclockwise direction to bring the bearing arm 164 into the position illustrated in FIGURE 9. Then the lever 46, being still held in this rotational position, is permitted to translate in a reverse direction until the bearing arm 164 directly engages both the arm 170 and the lever arm 139 as shown in FIGURE 10. Thereafter, the apparatus is held by the pin 174 in this modal position and the spacing of the female guide 31 from the head drum 14 is determined entirely by movement of the arm 170. The latter arm 170 is moved by apparatus of a type well known in the art for making automatic corrections in response to a sensing of signal frequency from the heads 16. If it is desired to return the apparatus to the "standard" position, the lever 46 must be pushed, turned clockwise, and released to return the apparatus to the position shown in FIGURE 8. During either of the above described modes of horizontal adjustment, the vertical adjustment of the female guide 31 may be maintained in a neutral position as illustrated in FIGURE 6, and by the arrows 120 and 121 of FIGURE 7; or the horizontal adjustment may be varied as by rotation of the knob 41 to move the wedge element 92 as shown in FIGURE 6 and to produce unequal spacings and head-to-tape pressures at the edges of the tape as illustrated by the arrows **120*a* and 121*a* of FIGURE 7, while not substantially changing the spacing or the head-to-tape pressure at the centerline of the tape, i.e. near the central axial plane 99** of the female guide as shown in FIGURE 6.

Thus there has been described a positioning mechanism including a female guide mounted on a swinging arm, the pivot for which is substantially a universal joint. The guide end of the arm is slidably mounted on two bearing elements, providing with the pivot a three-point suspension for the arm. The arm may be swung toward and away from the rotating head drum, sliding on the bearing elements in a plane parallel to the central axial plane of the female guide, so as to adjust the head-to-tape pressure at the centerline of the tape. The guide end of the arm may also be moved toward and away from the two bearing elements so as to inversely adjust the head-to-tape pressures at the edges of the tape. Each of these adjustments can be made substantially independently of the other.

What is claimed is:

1. A mechanism for positioning a concave guide to hold a magnetic tape in curved concentric relation to a rotating head assembly, comprising:

means for guiding said guide in pivoting motion toward and away from said head assembly, with the central axial plane of said guide always parallel to a predetermined axial plane of said head assembly;

means for adjusting the position of said guide with respect to said rotating head assembly only in a direction parallel to said central axial plane thereof; and means for adjusting the position of said guide with respect to said rotating head assembly only in a direction normal to said central axial plane thereof;

said adjusting means being operable independently from one another.

2. A mechanism for positioning a concave guide to hold a magnetic tape in curved concentric relation to a rotating head assembly, comprising:

a base plate mounting said head assembly and extending substantially parallel to the central axial plane of said guide;

an arm mounted on said base plate for pivoting motion substantially parallel thereto, said concave guide being mounted on said arm and pivoting therewith toward and away from said head assembly;

means mounted between said arm and base plate for adjustably spacing said arm and base plate apart while maintaining said central axial plane of said concave guide parallel to said base plate; and means for adjusting the position of said concave guide with respect to said rotating head assembly only in a direction parallel to said central axial plane thereof;

said means being operable independently from one another.

3. A mechanism for positioning a concave guide to hold a magnetic tape in curved concentric relation to a rotating head assembly, comprising:

a base plate mounting said head assembly and extending substantially parallel to the central axial plane of said guide;

an arm mounted on said base plate for pivoting motion substantially parallel thereto, said concave guide being mounted on said arm and pivoting therewith toward and away from said head assembly;

means mounted between said arm and base plate for adjustably spacing said arm and base plate apart while maintaining said central axial plane of said concave guide parallel to said base plate;

said last-named means including a wedge element mounted with the inclined surfaces thereof in a plane tangent to the pivoting arc of said concave guide, said base plate and arm having portions engaging said inclined surfaces for maintaining said central axial plane parallel to said base plate, and said wedge element being movable to adjust the spacing between said arm and base plate; and means for adjusting the position of said concave guide in a direction parallel to said central axial plane thereof;

said means being operable independently from one another.

4. A mechanism for positioning a concave guide to hold a magnetic tape in curved concentric relation to a rotating head assembly, comprising:

a base plate mounting said head assembly and extending substantially parallel to the central axial plane of said guide;

an arm mounted on said base plate for pivoting motion substantially parallel thereto, said concave guide being mounted on said arm and pivoting therewith toward and away from said head assembly;

means mounted between said arm and base plate for adjustably spacing said arm and base plate apart while maintaining said central axial plane of said concave guide parallel to said base plate;

said last-named means including a wedge element carried by said arm and mounted with the inclined surfaces thereof in a plane tangent to the pivoting arc of said concave guide, the inclined surface closest to said base plate being substantially parallel thereto, said base plate and arm having portions engaging said inclined surfaces for maintaining said central axial plane parallel to said base plate, said portions comprising a pair of adjustable ball guides extending from said base plate and an adjustable ball guide and a pin guide extending from said arm, said pin guide being oriented with the axis thereof transverse to said wedge element, and said wedge element being movable to adjust the spacing between said arm and base plate; and means for adjusting the position of said concave guide in a direction parallel to said central axial plane thereof;

said means being operable independently from one another.

5. A mechanism for positioning a concave guide to hold a magnetic tape in curved concentric relation to a rotating head assembly, comprising:

a base plate mounting said head assembly and extending substantially parallel to the central axial plane of said guide and to the axis of said head assembly;

an adjustable pivot pin extending from said base at an end thereof remote from the plane of said head assembly;

a bearing ball mounted at the extending end of said pivot pin;

an arm having a conical recess formed therein and fitting loosely over said pin and engaging said bearing ball, said arm extending parallel to said base for pivoting motion around said pin and bearing ball in a plane parallel to said base plate and for limited tilting motion around said ball with respect to the axis of said pin, said concave guide being mounted on said arm for pivoting therewith toward and away from said head assembly;

means mounted between said arm and base plate for adjustably spacing said arm and base plate apart while maintaining said central axial plane of said concave guide parallel to said base plate;

said last-named means including a wedge element carried by said arm and mounted with the inclined surfaces thereof in a plane tangent to the pivoting arc of said concave guide, the inclined surface closest to said base plate being substantially parallel thereto, said base plate and arm having portions engaging said inclined surfaces for maintaining said central axial plane parallel to said base plate, said portions comprising a pair of adjustable ball guides extending from said base plate and an adjustable ball guide and a pin guide extending from said arm, said pin guide being oriented with the axis thereof transversed to said wedge element, and said wedge element being movable to adjust the spacing between said arm and base plate; and means for adjusting the position of said concave guide in a direction parallel to said central axial plane thereof;

said means being operable independently from one another.

6. A mechanism for positioning a concave guide to hold a magnetic tape in curved concentric relation to a rotating head assembly, comprising:

a base plate mounting said head assembly and extending substantially parallel to the central axial plane of said guide to and the axis of said head assembly;

an adjustable pivot pin extending from said base plate at an end thereof remote from the plane of said head assembly;

a bearing ball mounted at the extending end of said pivot pin;

an arm having a conical recess formed therein and fitting loosely over said pin and engaging said bearing ball, said arm extending parallel to said base plate for pivoting motion around said pin and bearing ball in a plane parallel to said base plate and for limited tilting motion around said ball with respect to the axis of said pin, said concave guide being mounted on said arm for pivoting therewith toward and away from said head assembly;

means mounted between said arm and base plate for adjustable spacing said arm and base plate apart while maintaining said central axial plane of said concave guide parallel to said base plate;

said last-named means including a wedge element carried by said arm and mounted with the inclined surfaces thereof in a plane tangent to the pivoting arc of said concave guide, the inclined surface closest to said base plate being substantially parallel thereto, said base plate and arm having portions engaging said inclined surfaces for maintaining said central axial plane parallel to said base, said portions comprising a pair of adjustable ball guides extending from said base plate and an adjustable ball guide and a pin guide extending from said arm, said pin guide being oriented with the axis thereof transversed to said wedge element, and a manually operable adjusting screw threaded into said arm and engaging said wedge element for moving said element to adjust the spacing between said arm and base plate; and means for adjusting the position of said concave guide in a direction parallel to said central axial plane thereof;

said means being operable independently from one another.

7. A mechanism for positioning a concave guide to hold a magnetic tape in curved concentric relation to a rotating head assembly, comprising:

means for adjusting the position of said concave guide in a direction parallel to the central axial plane of said concave guide;

said last-named means including a spring engaging and urging said guide toward said head assembly, a first bearing element extending from said guide, a second bearing element engaging said first bearing element and receiving the force of said spring therefrom, a lever arm, a fulcrum mounting for said lever arm, said second bearing element being coupled to one end of said lever arm so that said guide is moved with and against the force of said spring by corresponding movement of the other end of said lever arm; and means for adjusting the position of said concave guide in a direction normal to said central axial plane thereof;

said means being operable independently from one another.

8. A mechanism for positioning a concave guide to hold a magnetic tape in curved concentric relation to a rotating head assembly, comprising:

a base plate mounting said head assembly and extending substantially parallel to the axis of said head assembly and to the central axial plane of said guide;

an arm mounted on said base plate for pivoting motion substantially parallel thereto, said concave guide being mounted on said arm and pivoting therewith toward and away from said head assembly;

means mounted between said arm and base plate for adjustably spacing said arm and base plate apart while maintaining said central axial plane of said concave guide parallel to said base plate; and means for adjusting the position of said concave guide in a direction parallel to said central axial plane thereof;

said last-named means including a spring mounted on said base plate and engaging and urging said arm toward said head assembly, a first bearing element extending from said arm, a second bearing element mounted for sliding movement on said base plate and engaging said first bearing element and receiving the force of said spring therefrom, a lever arm, a fulcrum mounting for said lever arm mounted on said base plate, said second bearing element being coupled to one end of said lever arm so that said guide is moved with and against the force of said spring by corresponding inverse movement of the other end of said lever arm;

said means being operable independently from one another.

9. A mechanism as claimed in claim 8, wherein said first bearing element is an adjustable element threaded into said arm and having a tungsten carbide bearing face, said second bearing element having a bearing ball mounted thereon and engaging said tungsten carbide bearing face of said first bearing element.

10. A mechanism for positioning a concave guide to hold a magnetic tape in curved concentric relation to a rotating head assembly, comprising:

a base plate mounting said head assembly and extending substantially parallel to the axis of said head assembly and to the central axial plane of said guide;

an arm mounted on said base plate for pivoting motion substantially parallel thereto, said concave guide being mounted on said arm and pivoting therewith toward and away from said head assembly;

means mounted between said arm and base plate for adjustably spacing said arm and base plate apart while maintaining said central axial plane of said concave guide parallel to said base plate; and means for adjusting the position of said concave guide in a direction parallel to said central axial plane thereof;

said last-named means including a spring mounted on said base plate and engaging and urging said arm toward said head assembly, a first bearing element extending from said arm, a second bearing element mounted for sliding movement on said base plate and engaging said first bearing element and receiving the force of said spring therefrom, a lever arm, a fulcrum mounting for said lever arm mounted on said base plate, said second bearing element being coupled to one end of said lever arm so that said guide is moved with and against the force of said spring by corresponding movement of the other end of said lever arm; and said last-named means also including a control device enabling selective positioning of said lever and said guide throughout a predetermined range of operating positions including a predetermined standard position, whereby said concave guide may be operated in said standard position for recording and subsequently playing back a particular tape, and may be operated in said range of positions for playing back a tape that has changed in physical dimensions or that was originally recorded upon a machine in which the concave guide was positioned otherwise than in said standard position;

said means being operable independently from one another.

11. A mechanism as claimed in claim 10, wherein a latch pin extends from said arm and a latch hook is secured to said spring for latching said pin and urging said arm toward said head assembly, and a manually operable latching lever is mounted on said back plate for releasing said lach hook.

12. A mechanism as claimed in claim 10, wherein an eccentric cam pin is mounted on said base plate for rotation between positions releasing and engaging said arm for correspondingly permitting and preventing operative approach of said concave guide to said head assembly, and a solenoid is mounted on said base plate and is coupled to said cam pin for rotating said cam pin to said releasing position when said solenoid is energized and for rotating said cam pin to said engaging position when said solenoid is de-energized, said solenoid being connected in the operating circuits of said head assembly for energization only during operative modes thereof, whereby upon a power failure, said concave guide is automatically withdrawn from said rotating head assembly and damage to said tape is prevented.

13. A mechanism as claimed in claim 10, wherein said control device includes a manually operable shaft mounted for rotation and endwise translation on said base plate, one end of said shaft exclusively bearing against said other end of said lever arm in a first position of translation and all corresponding positions of rotation, and also in a second position of translation and a corresponding first position of rotation, a bearing arm affixed to said shaft and exclusively bearing against said other end of said lever arm in all except said first position of translation of said shaft and in a corresponding second position of rotation thereof, a pin mounted on said base plate and preventing rotation of said shaft between said first and second positions of rotation except when said shaft is in said first position of translation, and an adjustable stop element engaging said bearing arm to hold said shaft against said lever arm in said first position of rotation and to establish said predetermined standard position for said concave guide, whereby said bearing arm is movable in said second position of rotation to translate said shaft and move said lever arm and concave guide through said predetermined range of operating positions.

14. A mechanism as claimed in claim 13, wherein a thumb lever is secured to said shaft for manual rotation and translation thereof.

15. A mechanism for positioning a concave guide to hold a magnetic tape in curved concentric relation to a rotating head assembly, comprising:

a base plate mounting said head assembly and extending substantially parallel to the axis of said head assembly and to the central axial plane of said guide;

an adjustable pivot pin extending from said base plate at an end thereof remote from the plane of said head assembly;

a bearing ball mounted at the extending end of said pivot pin;

an arm having a conical recess formed therein and fitting loosely over said pin and engaging said bearing ball, said arm extending parallel to said base plate for pivoting motion around said pin and bearing ball in a plane parallel to said base plate and for limited tilting motion around said ball with respect to the axis of said pin, said concave guide being mounted on said arm for pivoting therewith toward and away from said head assembly;

means mounted between said arm and base plate for adjustably spacing said arm and base plate apart while maintaining said central axial plane of said concave guide parallel to said base plate;

said first-named means including a wedge element carried by said arm and mounted with the inclined surfaces thereof in a plane tangent to the pivoting arc of said concave guide, the inclined surface closest to said base plate being substantially parallel thereto, said base plate and arm having portions engaging said inclined surfaces for maintaining said central axial plane parallel to said base, said portions comprising a pair of adjustable ball guides extending from said base plate and an adjustable ball guide and a pin guide extending from said arm, said pin guide being oriented with the axis thereof transversed to said wedge element, and a manually operable adjusting screw threaded into said arm and engaging said wedge element for moving said element to adjust the spacing between said arm and base plate; and means for adjusting the position of said concave guide in a direction parallel to said central axial plane thereof;

said last-named means including a spring mounted on said base plate and engaging and urging said arm toward head assembly, a first bearing element extending from said arm, a second bearing element mounted for sliding movement on said base plate and engaging said first bearing element and receiving the force of said spring therefrom, a lever arm, a fulcrum mounting for said lever arm mounted on said base plate, said second bearing element being coupled to one end of said lever arm so that said guide is moved with and against the force of said spring by corresponding movement of the other end of said lever arm;

said last-named means also including a latch pin extending from said arm and a latch hook secured to said spring for latching said pin and urging said arm toward said head assembly and toward said base plate, and a thumb lever mounted on said base plate for releasing said latch hook;

said last-named means also including an eccentric cam pin mounted on said base plate for rotation between positions releasing and engaging said arm for correspondingly permitting and preventing operative approach of said concave guide to said head assembly, and a solenoid mounted on said base plate and coupled to said cam pin for rotating said cam pin to said releasing position when said solenoid is energized and for rotating said cam pin to said engaging position when said solenoid is de-energized, said solenoid being connected in the operating circuits of said head assembly for energization only during operative modes thereof, whereby upon a power failure, said concave guide is automatically withdrawn from said rotating head assembly and damage to said tape is prevented;

said last-named means also including a control device enabling selective positioning of said lever and said guide throughout a predetermined range of operating positions including a predetermined standard position, whereby said concave guide may be operated in said standard position for recording and subsequently playing back a particular tape, and may be operated in said range of positions for playing back a tape that has changed in physical dimensions or that was originally recorded upon a machine in which the concave guide was positioned otherwise than in said standard position; and said control device including a shaft mounted for rotation and endwise translation on said base plate, one end of said shaft exclusively bearing against said other end of said lever arm in a first position of translation and all corresponding positions of rotation, and also in a second position of translation and a corresponding first position of rotation, a bearing arm affixed to said shaft and exclusively bearing against said other end of said lever arm in all except said first position of translation of said shaft and in a corresponding second position of rotation thereof, a pin mounted on said base plate and preventing rotation of said shaft between said first and second positions of rotation except when said shaft is in said first position of translation, an adjustable stop element engaging said bearing arm to hold said shaft against said lever arm in said first position of rotation and to establish said predetermined standard position for said concave guide, whereby said bearing arm is movable in said second position of rotation to translate said shaft and move said lever arm through said predetermined range of operating positions, and a thumb lever secured to said shaft for manual rotation and translation thereof;

said means being operable independently from one another.

References Cited

UNITED STATES PATENTS

| | | | |
|---|---|---|---|
| 2,942,061 | 6/1960 | Pfost et al. | 179—100.2 |
| 3,159,501 | 12/1964 | Maxey | 179—100.2 |
| 3,207,855 | 9/1965 | Barger | 179—100.2 |
| 3,213,193 | 10/1965 | Konishi | 179—100.2 |

BERNARD KONICK, *Primary Examiner.*

A. BERNARD, V. P. CANNEY, *Assistant Examiners.*